United States Patent
Brockett et al.

(10) Patent No.: US 9,092,483 B2
(45) Date of Patent: Jul. 28, 2015

(54) USER QUERY REFORMULATION USING RANDOM WALKS

(75) Inventors: Christopher John Brockett, Bellevue, WA (US); Jianfeng Gao, Kirkland, WA (US); Vahed Qazvinian, Ann Arbor, MI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 450 days.

(21) Appl. No.: 12/907,031

(22) Filed: Oct. 19, 2010

(65) Prior Publication Data

US 2012/0096042 A1    Apr. 19, 2012

(51) Int. Cl.
*G06F 17/30* (2006.01)

(52) U.S. Cl.
CPC ................................ *G06F 17/30448* (2013.01)

(58) Field of Classification Search
CPC ................................................. G06F 17/30646
USPC .................... 707/798, 713, 762, 767
See application file for complete search history.

(56) References Cited

U.S. PATENT DOCUMENTS

| | | | |
|---|---|---|---|
| 7,617,164 B2 * | 11/2009 | Burges et al. ................ | 706/15 |
| 7,953,746 B1 * | 5/2011 | Garg et al. ................... | 707/762 |
| 2007/0266002 A1 | 11/2007 | Chowdhury et al. | |
| 2008/0319947 A1 * | 12/2008 | Latzina et al. ................ | 707/3 |
| 2010/0082605 A1 | 4/2010 | Dupret et al. | |
| 2010/0306229 A1 * | 12/2010 | Timm et al. .................. | 707/767 |

OTHER PUBLICATIONS

"Query Suggestion Using Hitting Time", by: Qiaozhu Mei, published Oct. 2008 http://delivery.acm.org/10.1145/1460000/1458145/p469-mei.pdf?ip=151.207.246.5&acc=ACTIVE%20SERVICE&CFID=158206071&CFTOKEN=95590323&_ACM_=1355757706_410c48ae6c352ad6e432a77cba3db04a.*
Jones, et al., "Generating Query Substitutions", Retrieved at << http://www2006.org/programme/files/pdf/3100.pdf >>, May 23-26, 2006, pp. 10.
Kleinberg, Jon M., "Authoritative Sources in a Hyperlinked Environment", Retrieved at << http://citeseerx.ist.psu.edu/viewdoc/download?doi=10.1.1.120.3875&rep=rep1&type=pdf >>, Journal of the ACM, (JACM), vol. 46, No. 5, Sep. 1999, pp. 34.
Koehn, et al., "Statistical Phrase-based Translation", Retrieved at << http://www.isi.edu/~marcu/papers/phrases-hlt2003.pdf >>, Jul. 22-23, 2002, pp. 7.

(Continued)

*Primary Examiner* — Apu Mofiz
*Assistant Examiner* — Chelcie Daye
(74) *Attorney, Agent, or Firm* — Steve Wight; Doug Barker; Micky Minhas (57) ABSTRACT

There is provided a computer-implemented method for user query reformulation. A graph is created to represent a relationship between previous user query terms. The graph may represent the previous user searches in n-grams that correspond to nodes. A random walk analysis is performed to determine probabilities that various n-grams corresponding to nodes of the graph could be used to effectively alter a user search term. The probabilities represent a quantification of relationships between nodes of the graph. A determination may be made regarding whether to reformulate the user query based on a relationship between a user search term in the user query and a graphed search term represented by a node of the graph. The determination takes into account a relationship between the user search term and the graphed search term.

20 Claims, 5 Drawing Sheets

(56) References Cited

OTHER PUBLICATIONS

Kok, et al., "Hitting the Right Paraphrases in Good Time", Retrieved at << http://www.aclweb.org/anthology/N/N10/N10-1017.pdf >>, Jun. 2010, pp. 145-153.
Lafferty, et al., "Document Language Models, Query Models, and Risk Minimization for Information Retrieval", Retrieved at << http://www.iro.umontreal.ca/~nie/IFT6255/lafferty-zhai.pdf >>, Sep. 9-12, 2001, pp. 111-119.
Lao, et al., "Fast Query Execution for Retrieval Models based on Path Constrained Random Walks", Retrieved at << http://www.cs.cmu.edu/~wcohen/postscript/Ni_cohen_kdd_2010_sub.pdf >>, International Conference on Knowledge Discovery and Data Mining, Proceedings of the 16th ACM SIGKDD international conference on Knowledge discovery and data mining, Jul. 25-28, 2010, pp. 8.
Li, et al., "Exploring Distributional Similarity based Models for Query Spelling Correction", Retrieved at << http://citeseerx.ist.psu.edu/viewdoc/download?doi=10.1.1.114.6358&rep=rep1&type=pdf >>, Jul. 2006, pp. 1025-1032.
Minkov, et al., "Learning Graph Walk based Similarity Measures for Parsed Text", Retrieved at << http://www.cs.cmu.edu/~einat/emnlp-08.pdf >>, Annual Meeting of the ACL, Proceedings of the Conference on Empirical Methods in Natural Language Processing, Oct. 25-27, 2008, pp. 10.
Radlinski, et al., "Active Exploration for Learning Rankings from Clickthrough Data", Retrieved at << http://citeseerx.ist.psu.edu/viewdoc/download?doi=10.1.1.147.50&rep=rep1&type=pdf >>, Aug. 12-15, 2007, pp. 10.
Salton, et al., "Improving Retrieval Performance by Relevance Feedback", Retrieved at << http://citeseerx.ist.psu.edu/viewdoc/download?doi=10.1.1.92.3553&rep=rep1&type=pdf >>, Jun. 1990, pp. 288-297.
Sun, et al., "Learning Phrase-based Spelling Error Models from Clickthrough Data", Retrieved at << http://research.microsoft.com/en-us/um/people/jfgao/paper/116_camera-ready.pdf >>, ACL Workshops, Proceedings of the 48th Annual Meeting of the Association for Computational Linguistics, Jul. 11-16, 2010, pp. 9.
Svore, et al., "A machine learning approach for improved bm25 retrieval", Retrieved at << http://research.microsoft.com/pubs/101323/LearningBM25MSRTechReport.pdf >>, Conference on Information and Knowledge Management, Proceeding of the 18th ACM conference on Information and knowledge management, Nov. 2-6, 2009, pp. 25.
Xu, et al., "Query Expansion using Local and Global Document Analysis", Retrieved at << http://citeseerx.ist.psu.edu/viewdoc/download?doi=10.1.1.49.3174&rep=rep1&type=pdf >>, Annual ACM Conference on Research and Development in Information Retrieval, Proceedings of the 19th annual international ACM SIGIR conference on Research and development in information retrieval, Aug. 18-22, 1996, pp. 8.
Xue, et al., "Optimizing Web Search using Web Click-through Data", Retrieved at << http://apex.sjtu.edu.cn/people/grxue/paper/CIKM_Paper_f184_Xue >>, Conference on Information and Knowledge Management, Proceedings of the thirteenth ACM international conference on Information and knowledge management, Nov. 8-13, 2004, pp. 9.
Boldi, et al., "Query Suggestions Using Query-Flow Graphs", Retreived at << research.yahoo.com/files/p56-boldi.pdf >>, 2009, pp. 8.
Huang, et al., "Analyzing and Evaluating Query Reformulation Strategies in Web Search Logs", Retrieved at << http://jeffhuang.com/Final_Reformulation_CIKM09.pdf >>, 2009, pp. 10.
Ma, et al., "Diversifying Query Suggestion Results", Retrieved at << http://www.aaai.org/ocs/index.php/AAAI/AAAI10/paper/view/1827/2219 >>, 2010, pp. 1399-1404.
Riezler, Stefan, "Query Rewriting using Monolingual Statistical Machine Translation", Retrieved at << http://www.mitpressjournals.org/doi/pdf/10.1162/coli_a_00010 >>, 2010, pp. 14.
Herdagdelen, et al., "Generalized Syntactic and Semantic Models of Query Reformulation", Retrieved at << http://static.googleusercontent.com/external_content/untrusted_dlcp/research.google.com/en//pubs/archive/36337.pdf >>, Jul. 19, 2010.
Billerbeck, et al., "Exploiting Click-Through Data for Entity Retrieval", Retrieved at << http://www.I3s.de/web/upload/documents/1/sigir10.pdf >>, Jul. 19, 2010, pp. 2.
Boldi, et al., "From "Dango" to "Japanese Cakes": Query Reformulation Models and Patterns", Retrieved at << research.yahoo.com/files/boldi_2009_query_reformulations.pdf >>, 2008, pp. 8.
Bannard, et al., "Paraphrasing with Bilingual Parallel Corpora", Retrieved at << http://www.cs.jhu.edu/~ccb/publications/paraphrasing-with-bilingual-parallel-corpora.pdf >>, pp. 8.
Barzilay, et al., "Learning to Paraphrase: An Unsupervised Approach using Multiple-sequence Alignment", Retrieved at http://acl.ldc.upenn.edu/N/NO3/NO3-1003.pdf >>, pp. 8.
Barzilay, et al., "Extracting Paraphrases from a Parallel Corpus", Retrieved at << http://acl.ldc.upenn.edu/acl2001/MAIN/BARZILAY.PDF >>, pp. 8.
Barzilay, ett al., "Information Fusion in the Context of Multi-document Summarization", Retrieved at << http://www.cs.bgu.ac.il/~elhadad/papers/fusion.pdf >>, pp. 8.
Brand, Matthew, "A Random Walks Perspective on Maximizing Satisfaction and Profit", Retrieved at << http://www.siam.org/proceedings/datamining/2005/dm05_02brandm.pdf >>, pp. 12-19.
Callison-Burch, et al., "Improved Statistical Machine Translation using Paraphrases ", Retrieved at << http://www.cs.jhu.edu/~ccb/publications/improved-statistical-machine-translation-using-paraphrases.pdf >>, pp. 8.
Callison-Burch, Chris, "Syntactic Constraints on Paraphrases Extracted from Parallel Corpora", Retrieved at << http://citeseerx.ist.psu.edu/viewdoc/download?doi=10.1.1.142.636&rep=rep1&type=pdf >>, pp. 10.
Chen, et al., "Intersecting Multilingual Data for Faster and Better Statistical Translations", Retrieved at << http://www.aclweb.org/anthology/N/N09/N09-1015.pdf >>, Jun. 2009, pp. 128-136.
Das, et al., "Paraphrase Identification as Probabilistic Quasi-synchronous Recognition", Retrieved at << http://aclweb.org/anthology-new/P/P09/P09-1053.pdf >>, Aug. 2009, pp. 468-476.
Gorelick, et al., "Shape Representation and Classification using the Poisson Equation", Retrieved at << http://www.dam.brown.edu/people/eitans/publications/GorelickEtAl-PoissonCVPR04.pdf >>, pp. 1-7.
Grady, et al., Isoperimetric Graph Partitioning for Image Segmentation, Retrieved at << http://ieeexplore.ieee.org/stamp/stamp.jsp?tp=&arnumber=1580491 >>, IEEE Transactions on Pattern Analysis and Machine Intelligence, vol. 28, No. 3, Mar. 2006, pp. 469-475.
Ibrahim, et al., "Extracting Structural Paraphrases from Aligned Monolingual Corpora", Retrieved at << http://userweb.cs.utexas.edu/users/aibrahim/publications/Ibrahim-etal-IWP2003.pdf >>, pp. 8.
Kauchak, et al., "Paraphrasing for Automatic Evaluation", Retrieved at << http://acl.ldc.upenn.edu/N/N06/N06-1058.pdf >>, Jun. 2006, pp. 455-462.
Koehn, Philipp, "Europarl: A Parallel Corpus for Statistical Machine Translation", Retrieved at << http://www.mt-archive.info/MTS-2005-Koehn.pdf >>, pp. 79-86.
Lenke, Nils, "Anticipating the Reader's Problems and the Automatic Generation of Paraphrases", Retrieved at << http://acl.ldc.upenn.edu/C/C94/C94-1051.pdf >>, pp. 319-323.
Liang, et al., "Alignment by Agreement", Retrieved at << http://acl.ldc.upenn.edu/N/N06/N06-1014.pdf >>, Jun. 2006, pp. 104-111.
Nowell-Liben, et al. "The Link Prediction Problem for Social Networks", Retrieved at << http://www.cs.cornell.edu/home/kleinber/link-pred.pdf >>, Jan. 8, 2004, pp. 1-19.
Lin, et al., "Discovery of Inference Rules for Question Answering ", Retrieved at << http://webdocs.cs.ualberta.ca/~lindek/papers/jnle01.pdf >>, pp. 21.
Lovasz L. "Random Walks on Graphs: A Survey", Retrieved at << http://www.cs.unibo.it/babaoglu/courses/cas/resources/tutorials/RandomWalks.pdf >>, pp. 46.
Madnani, et al., "Using Paraphrases for Parameter Tuning in Statistical Machine Translation", Retrieved at << http://www.umiacs.umd.edu/~nmadnani/pdf/paraphrase-wmt07.pdf >>, pp. 8.

(56) References Cited

OTHER PUBLICATIONS

McKeown, et al., "Tracking and Summarizing News on a Daily basis with Columbia's Newsblaster", Retrieved at << http://www.google.co.uk/url?sa=t&source=web&cd=1&ved=0CBcQFjAA&url=http%3A%2F%2Fciteseerx.ist.psu.edu%2Fviewdoc%2Fdownload%3Fdoi%3D10.1.1.11.9542%26rep%3Drep1%26type%3Dpdf&rct=j&q=Tracking%20and%20summarizing%20news%20on%20a%20-daily%20basis%20with%20columbia%E2%80%99s%20news-blaster&ei=jleETNWqJdvNjAeXm4WcCQ&usg=AFQjCNGFN0STPMHRph9ePFav2_QiGyOVmA >>, pp. 6.

Mei, et al., "Query Suggestion Using Hitting Time", Retrieved at << http://sifaka.cs.uiuc.edu/~qmei2/pub/cikm08-sugg.pdf >>, Oct. 26-30, 2008, pp. 9.

Och, et al., "The Alignment Template Approach to Statistical Machine Translation", Retrieved at << http://www.aclweb.org/anthology-new/J/J04/J04-4002.pdf >>, vol. 30, Jun. 1, 2004, pp. 417-449.

Pang, et al., "Syntax-based Alignment of Multiple Translations: Extracting Paraphrases and Generating New Sentences", Retrieved at << http://www.isi.edu/natural-language/projects/rewrite/bopang.pdf >>, pp. 8.

Quirk, et al., "Monolingual Machine Translation for Paraphrase Generation", Retrieved at << http://www.mt-archive.info/EMNLP-2004-Quirk.pdf >>, pp. 8.

Ravichandran, et al., "Learning Surface Text Patterns for a Question Answering System", Retrieved at << http://www.isi.edu/natural-language/projects/webclopedia/pubs/02ACL-patterns.pdf >>, pp. 7.

Riezler, et al., "Statistical Machine Translation for Query Expansion in Answer Retrieval", Retrieved at << http://acl.ldc.upenn.edu/P/P07/P07-1059.pdf >>, Jun. 2007, pp. 464-471.

Sarkar, et al., "A Tractable Approach to Finding Closest Truncated-commute-time Neighbors in Large Graphs", Retrieved at << http://www.autonlab.org/autonweb/17408/version/7/part/5/data/UAI07_sarkar_moore_final.pdf?branch=main&language=en >>, 2007, pp. 9.

Sarkar, et al., "Fast Incremental Proximity Search in Large Graphs", Retrieved at << http://icml2008.cs.helsinki.fi/papers/565.pdf >>, pp. 9.

Stede, Manfred, "Lexical Semantics and Knowledge Representation in Multilingual Text Generation", Retrieved at << http://citeseerx.ist.psu.edu/viewdoc/download?doi=10.1.1.47.4743&rep=rep1&type=pdf >>, pp. 171.

Zhao, et al., "Pivot Approach for Extracting Paraphrase Patterns from Bilingual Corpora", Retrieved at << http://www.aclweb.org/anthology/P/P08/P08-1089.pdf >>, Jun. 2008, pp. 780-788.

Cucerzan, et al., "Spelling Correction as an Iterative Process that Exploits the Collective Knowledge of Web Users", Retrieved at << http://acl.ldc.upenn.edu/acl2004/emnlp/pdf/Cucerzan.pdf >>, pp. 8.

Agichtein, et al., "Learning Search Engine Specific Query Transformations for Question Answering", Retrieved at http://www.cs.columbia.edu/~eugene/papers/www10.pdf >>, May 1-5, 2001, pp. 10.

Andrew, et al., "Scalable Training of I1-Regularized Log-Linear Models", Retrieved at << http://nlp.stanford.edu/~pupochik/papers/andrew07scalable.pdf >>, 2007, pp. 8.

Brin, et al., "The Anatomy of a Large-scale Hypertextual Web Search Engine", Retrieved at << http://citeseerx.ist.psu.edu/viewdoc/download?doi=10.1.1.42.3243&rep=rep1&type=pdf >>, pp. 20.

Church, et al., "The Wild Thing", Retrieved at << http://research.microsoft.com/pubs/66808/wildthing.pdf >>, Jun. 2005, pp. 93-96.

Church, et al., "The Wild Thing Goes Local", Retrieved at << https://research.microsoft.com/pubs/69457/localwildthing.pdf >>, Jul. 23-27, 2007,p. 1.

Collins-Thompson, et al., "Query Expansion Using Random Walk Models", Retrieved at << http://citeseerx.ist.psu.edu/viewdoc/download;jsessionid=9CA658C5E1BD2C7C52F0088026F300-CC?doi=10.1.1.64.1288&rep=rep1&type=pdf >>, Oct. 31-Nov. 5, 2005, pp. 8.

Gao, et al., "A Comparative Study of Parameter Estimation Methods for Statistical Natural Language Processing", Retrieved at << http://acl.ldc.upenn.edu/P/P07/P07-1104.pdf >>, Jun. 2007, pp. 824-831.

Gao, et al., "Smoothing Clickthrough Data for Web Search Ranking", Retrieved at << http://citeseerx.ist.psu.edu/viewdoc/download?doi=10.1.1.150.2058&rep=rep1&type=pdf >>, Jul. 19-23, 2009, pp. 9.

Jarvelin, et al., "Cumulated Gain-based Evaluation of IR Techniques", Retrieved at << http://citeseerx.ist.psu.edu/viewdoc/download?doi=10.1.1.20.3161&rep=rep1&type=pdf >>, pp. 29.

Joachims, et al., "Accurately Interpreting Clickthrough Data as Implicit Feedback", Retrieved at << http://www.cs.cornell.edu/People/tj/publications/joachims_etal_05a.pdf >>, Aug. 15-19, 2005, pp. 8.

\* cited by examiner

USER QUERY REFORMULATION USING RANDOM WALKS

BACKGROUND

Search engines may reformulate user queries to provide more relevant search results. Reformulation may take the form of substitution or more typically, by expansion in order to return to users the most relevant results given the presumable intent of the query. Effective reformulation of queries has proved to be a challenging problem. Determining when to attempt to reformulate is itself a major problem, since a minor change in wording can dramatically affect results, often negatively from the user's perspective.

SUMMARY

The following presents a simplified summary of the subject innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to a system and method for performing user query reformulation. An exemplary method comprises creating a graph that represents a relationship between previous user query terms. The graph comprises nodes that represent the previous user query terms. A random walk analysis may be performed to quantify relationships between nodes of the graph. The relationships may comprise probabilities that various n-grams (bigrams, trigrams or the like) could be used to effectively alter a user search term. A determination may be made regarding whether to reformulate a user query based on a relationship between a user search term in the user query and a graphed search term represented by a node of the graph. The determination may take into account a relationship between the user search term and the graphed search term.

A system for improving the quality of search results according to the subject innovation may comprise a processing unit, and a system memory. The system memory comprises code configured to direct the processing unit to determine whether to reformulate a user query to a search engine based on a relationship between a user search term in the user query and a graphed search term. The graphed search term is represented in a graph having nodes that represent search terms of previous user queries and edges representing relationships between previous search terms. The decision to reformulate the user query may be made taking into account the relationship between the user search term and the graphed search term. The relationship is based in part on a result of a random walk analysis to quantify relationships between nodes of the graph.

An exemplary embodiment of the subject innovation relates to one or more computer-readable media. The one or more computer-readable media comprise code configured to direct a processing unit to determine whether to reformulate a user query to a search engine based on a relationship between a user search term in the user query and a graphed search term. The graphed search term is represented by a node of a graph that denotes relationships between search terms of previous user searches. The relationships are based in part on a result of a random walk analysis to quantify relationships between nodes of the graph. The decision to reformulate the user query takes into account a relationship between the user search term and the graphed search term.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "search engine," "browser," "server," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media. Non-transitory computer-readable storage media can include but are not limited to tangible magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

1.0 Overview of the Subject Innovation. In order to present internet users with documents that are relevant to their information needs, search engines frequently reformulate queries, either by replacing the query with a new one (query substitution) or expanding it with additional terms (query expansion). Query reformulation is a challenging task, and one that is highly context sensitive. Where a reformulation may be helpful in one case, elsewhere the same reformulation may turn out to be ineffective, or worse yet, harmful to the search. For example, swapping "mountain lions" for "cougars" can potentially improve results, but not when "cougars" is the name of a college football team (as in "Washington State Cougars"). In such instances, a global approach that modifies the query regardless of the results (on the basis of, for example, a thesaurus) may prove less successful than computationally intensive local methods, e.g., relevance feedback, that expand the query on the basis of documents initially returned by the search.

The subject innovation relates to a graph-based method of reformulating queries that takes into account contextual information. Documents retrieved by web search are associated with clickstream data including multiple streams, for example, body, title, URL, anchor and user clicks that offer a rich set of data for modeling relevance. Pairwise, these streams can be viewed as parallel corpora, analogous with those employed in statistical machine translation. Using these corpora, monolingual paraphrases can be acquired for use in reformulating queries, each pairing representing a different edge type in a graph. Graph models of this kind can be used in combining data from multiple language pairs for paraphrase acquisition, and provide a flexible and readily extensible framework in which to embed the heterogeneous knowledge represented by these different text streams and any other relevant information (e.g., thesaurus or morphological information). To enforce contextuality, each lexical node in the graph comprises a bigram, rather than an individual term. An exemplary graph is a mixture model in which the weights of different edge types are optimized by training on a collection of search results. A model for query reformulation is developed by performing a random walk on this graph. Development of the model employs a hitting time algorithm that allows transformations to be found efficiently on a very large graph, modified to accommodate differently weighted edge types. A multigraph that combines multiple sources of information according to the subject innovation may provide more effective query reformulations that graphs built from any single source.

Query reformulation according to the subject innovation employs user clickthrough or other behavioral data to perform methods of learning query reformulations (alternations and substitutions) that are contextually plausible. Phrasal query reformulations, including alterations and substitutions are identified on the basis of machine translation models. Multiple machine translation models may be combined into a single model to rank the various translations. Acquired query reformulations may be ranked on the basis of a Markov random walk on a graph with weighted edge types, in which the weights are optimized through training. The subject innovation also relates to determining when not to reformulate a query, on the basis of a Markov random walk on a graph that returns to the original string.

Figure 1:
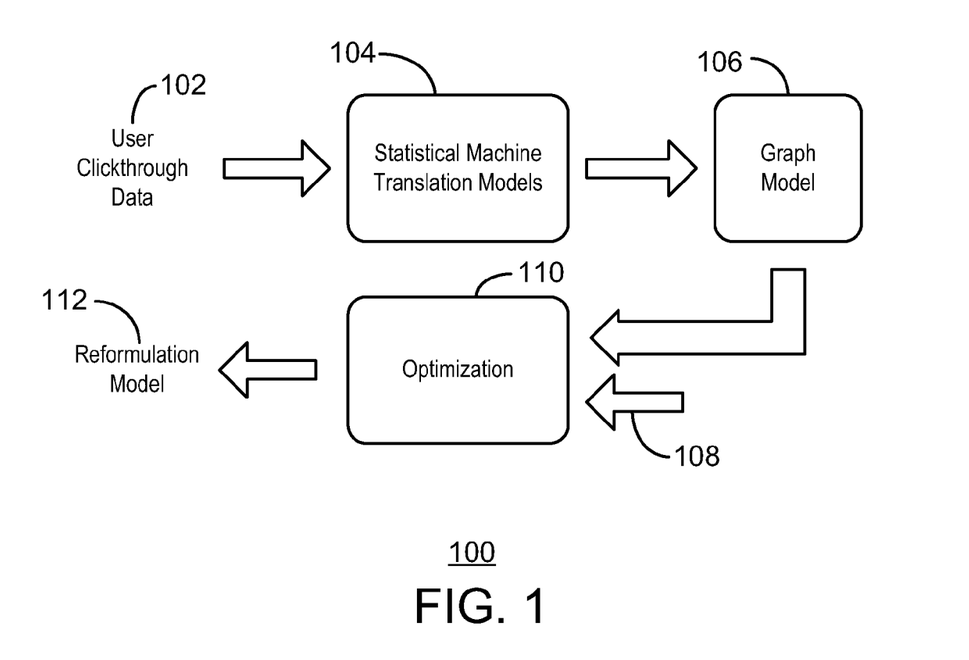
FIG. 1 is a block diagram of a system for query reformulation in accordance with the subject innovation.

FIG. 1 is a block diagram 100 of a system for query reformulation in accordance with the subject innovation. User clickthrough data 102 is provided to one or more statistical machine translation models 104. The statistical machine translation models 104 are used to provide a graph model 106. The graph model 106, along with training data 108, is subjected to an optimization process 110. The result of the optimization process 110 is a reformulation model 112. The reformulation model 112 is used to determine when user queries may be reformulated. These process steps and components are explained in detail herein.

A first step in building one of the statistical machine translation models 104 is to map terms in queries to terms in document streams from search results, using user clicks on a link to determine whether or not a query is relevant to the document. This may be treated as a machine translation problem regarding the alignment of various pairs of items such as query and title, query and url, and url and title, to name three examples. Each pair can be considered a separate parallel corpus. Other kinds of streams may also be used, e.g., query and anchor text, title and anchor text, url and anchor text.

Alignment may use both conventional phrasal statistical machine translation models (e.g., IBM1 and HMM). These statistical machine translation models might incorporate one or more language models. Both phrasal (ngram) and lexical (composed unigram) alignment probabilities may be generated, in each direction, for each of the aligned streams. Other alignments, for example, structural or dependency trees, if available, could also be employed in addition to the above.

Graphs of potentially relevant n-grams (bigrams, trigrams and higher) that provide contextual support for reformulations may thus be built. The use of lexical alignments enables the modeling of the probabilities of n-grams of different length in a consistent manner and allows for smoothing of low frequency n-grams. Such low frequency n-grams may be represented as different edge types from those of phrasal probabilities in the graph.

Figure 2:
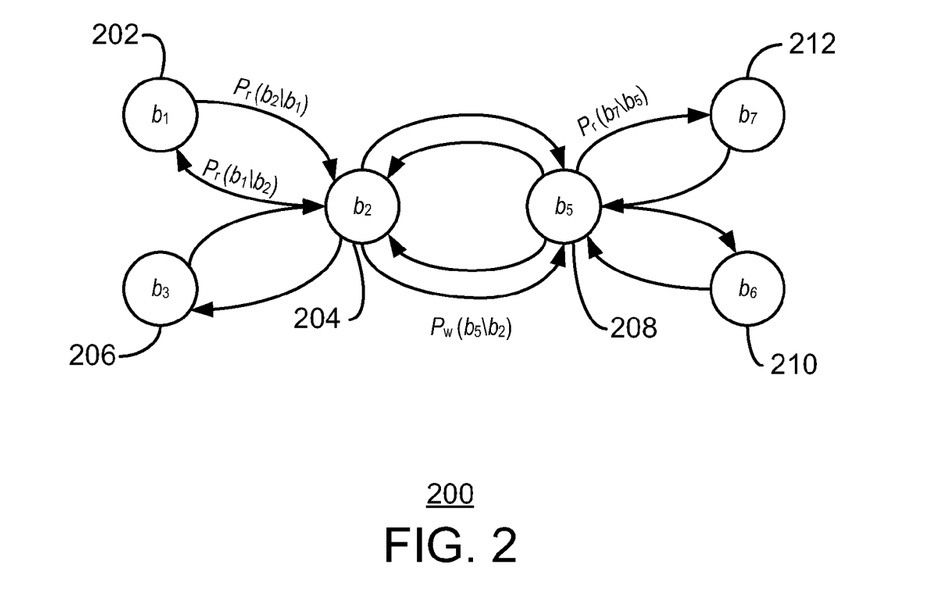
FIG. 2 is a block diagram of a graph model according to the subject innovation.

FIG. 2 is a block diagram of a graph 200 according to the subject innovation. The graph 200 may be built such that each ngram is a node. The exemplary graph 200 includes a node b1 202, a node b2 204, a node b3 206, a node b5 208, and node b6 210 and a node b7 212. Nodes may be connected by edges, shown as arrows between nodes in FIG. 2, representing the probabilities of a translational mapping in each direction. A node in the graph 200 represents a query term (or a substring of a query, such as bigram). An arc or edge represents that a node can be transformed to another node. According to an exemplary embodiment, arcs or edges are weighted by a transformation (or translation) probability. In an exemplary embodiment, the graph may comprise a multigraph, which means that there may be multiple edges between nodes representing the different kinds of relationships.

According to the subject innovation, a graph may inherently contain loops and self edges (when an n-gram translates as itself). It is therefore possible that the most relevant path through the graph may reach the original query. This allows a determination that the original query is not to be changed (reformulated). Like statistical machine translation, a method according to the subject innovation may be resistant to noise relative to other models that depend on curated data (handcrafted thesauri and ontologies, e.g. WordNet), but could permit their incorporation as new edges. Similarly, the subject innovation may provide a method that is more readily adapted to new domains and data and that can be relatively readily updated over time.

With respect to the optimization process 110, the weights of the different edge types between nodes may be optimized by training on a corpus of tagged training data, comprising queries, urls and tags indicating the relative relevance of the url to the query. The walks may be sampled, terminating using a limiting methodology such as a truncated hitting time algorithm to determine a suitable cutoff. As described herein, hitting time represents a degree of relevance between a search term in a graph created according to the subject innovation and the user search term being evaluated for reformulation. A feature vector parameterized by hitting times may be created with which to determine the appropriateness of a potential reformulation.

Reformulation of queries, including substitutions or expansions can be generated by selecting the top candidate or candidates for replacements returned by the walk. If the most relevant candidate n-gram is identical to the original string, then no attempt at reformulation is made. This means that the decision to keep the same query is not subject to a not-necessarily-robust threshold, but is an inherent feature of a model according to the subject innovation.

Section 2 of the following description explains a graph-based query reformulation methodology according to the subject innovation. In Section 3, data is discussed, as well as baseline methods, experiments, and results relevant to the subject innovation.

2 Query Reformulation Model 2.1 Overview

In order to reformulate queries according to the subject innovation, a large graph (network) of n-grams is built using Internet search logs. Data for each Internet search log is represented as a parallel corpus of phrases and bigram transformation probabilities are estimated. These probabilities are then used to build the n-gram graph. For a given test query, a random walk model is used on this graph to find possible potential bigrams that can be added to the query for expansion.

Figure 3:
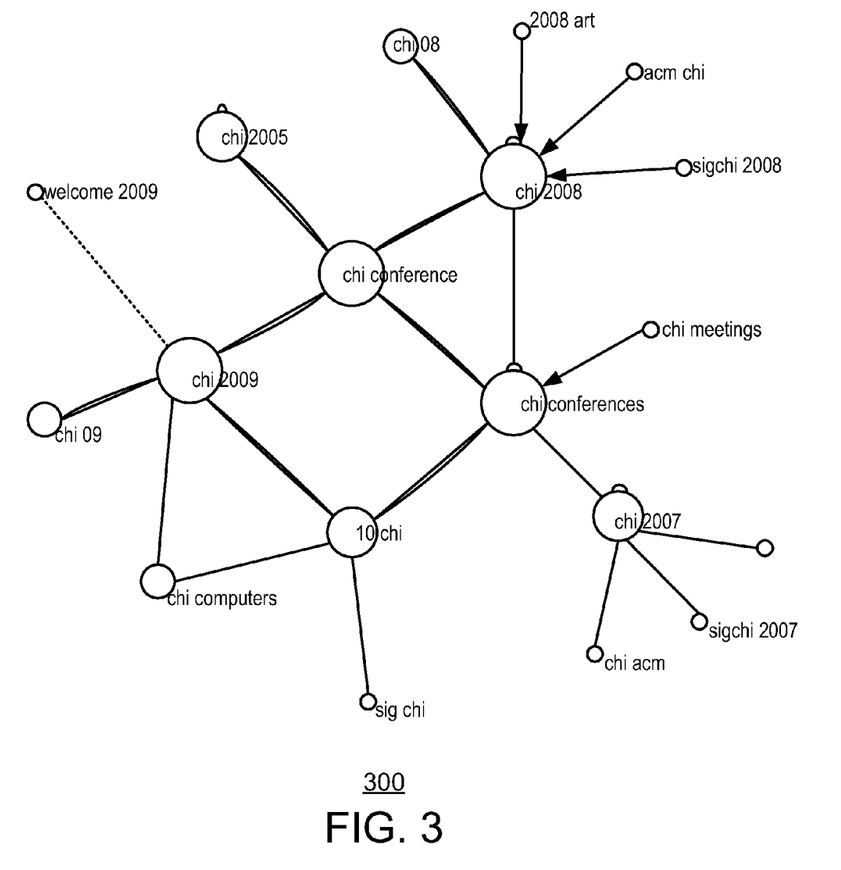
FIG. 3 is a diagram of a component of an n-gram graph according to the subject innovation.

FIG. 3 is a diagram of a component of an n-gram graph 300 according to the subject innovation. As described herein, the n-gram graph may comprise bigrams, trigrams or the like, generally referred to herein as n-grams. The n-gram graph 300 can be used to alter "chi meeting" to "chi conferences" in a given search query. In the n-gram graph 300, edge types may be color-coded or shown in different styles such as different dash types for readability. The size of each node in the n-gram graph 300 is proportional to its network centrality.

The use of a graph structure and graph based measures to map n-grams to candidates may provide an advantage relative to other models since it enables the use of different sources of information. In addition, transformation pairs that do not exist in any individual parallel corpus may be found. Moreover, the graph structure represents a flexible framework to incorporate knowledge that is useful for query reformulation, such as stemming or human-compiled dictionary/thesaurus. However, using the graph model may include challenges such as efficiently constructing a graph on a large scale and efficiently performing query reformulation on the graph. Additional challenges may include modeling context information that is useful for query reformulation, balancing the relative contribution of different transformations derived from different training data. Each of these issues is discussed in greater detail herein.

The n-gram graph 300 is a directed multigraph G=(V,E) comprising a set V of vertices representing bigrams, and a set E, of directed edges representing alignment probabilities where $E \subseteq V \times V$. G has a corresponding adjacency matrix W in which $W_{ij}$ is the weight of the edge from i to j. Once normalized, the W represents the transition probabilities between nodes. The transition probability between i and j, $p_{ij}$, shows the probability that a random walk, which is at node i, will move to its neighbor j in the next step.

Let A be a subset of V, and $X_t$ denote the position of a random walk at time step t. The hitting time $h_A$ is the first time that the random walk is at a vertex in A, therefore, $h_A = \min\{t: X_t \in A, t \geq 0\}$. The hitting time between two nodes i and j denoted by $h_{ij}$ is the number of steps that a random walk, starting at i, takes to reach j for the first time. Hitting time can be expressed using a linear system and may have a single solution:

$$h_{i,A} = \begin{cases} 0, & \text{if } i \in A \\ \sum_{i \notin A} p_{ij} h_{jA} + 1, & \text{if } i \notin A \end{cases}$$

It is possible that hitting time may be sensitive to graph topology. For instance, if j is a node with high stationary distribution, then $h_{ij}$ will be small regardless of i's identity. Similarly, when j is too distant or unreachable from i then $h_{ij}$ would be infinite.

To overcome these shortcomings, truncated hitting time, which limits the random walk length to a parameter T may be used. Based on this definition, the truncated hitting time between i and j, $h_{ij}^T$ can be defined as $$h_{ij}^T = \max(h_{ij}, T)$$

For larger values of T, $h_{ij}^T$ may provide an improved estimate of $h_{ij}$:

$$\lim_{T \to \infty} h_{ij}^T = h_{ij}$$

2.2 Graph Construction

A Web document may include several fields of information. Content fields like body text and titles are fields that are written by the author of the Web page, and Popularity fields, like anchor text and query click are usually generated by other authors.

Collecting all the popularity information for a Web page may involve information to be aggregated from all other authors and users. Moreover, collecting popularity information may be a more difficult task than collecting content information. Popularity fields are often highly repetitive for popular pages, and are empty or very short for less popular (so-called tail) pages. According to the subject innovation, two content fields may be used: URLs and Web page HTML titles, as well as a popularity field, query click information. The query click information may be extracted from search engine session data. The query click data may include query sessions extracted from one year of query log files of a commercial search engine.

The query click data with multi-field description of documents enables the generation of parallel corpora of paired phrases from different fields. These parallel corpora can be used to train translation models and extract aligned phrases (bi-phrases). Regardless of data selection and features, the subject innovation may be applied to any parallel corpus of similar nature.

According to an exemplary embodiment, a large amount of clickthrough data is used to build a graph. Each data point in such a dataset may include a URL, its title, and a number of queries corresponding to that URL. Each Query-URL pair (q,U), shows a click on U in the search result of q from a popular commercial search engine.

Three parallel corpora may be made using three data sources: HTML Titles, tokenized URLs, and Queries. Each parallel corpus consists of a number phrase pairs from two of theses sources. For instance, the Title-URL parallel corpus includes tokenized URLs and their corresponding HTML titles. Similarly, in the Query-Title corpus, queries are aligned to HTML titles of corresponding clickthrough URLs, and so forth. Once each parallel text corpus is built, a phrase-based alignment model may be used to extract alignment probabilities between different bigrams. In Natural Language Processing (NLP), extracting alignments is the task of establishing links between corresponding phrases in two related sentences. With respect to Statistical Machine Translation, bi-phrases may be extracted and their replacement probabilities estimated. Once phrases are aligned, the conditional relative frequency estimates between bigrams are approximated as $$p(b_i | b_j) = \frac{N(b_j, b_i)}{\sum_k N(b_j, b_k)} \quad (1)$$

where $N(b_j, b_i)$ is the number of times that $b_j$ is aligned to $b_i$ in the training data. Using this alignment scheme, phrases (comprising n-grams, in this instance, bigrams) may be aligned in each parallel corpus and conditional probabilities extracted between different n-grams.

More formally, suppose that $b_i$ and $b_j$ are two bigrams. For each parallel corpus C, a directed edge from $b_j$ to $b_i$ with weight $$p(b_i | b_j, C)$$

of a type defined by the corpus C may be included if this probability is greater or equal to a pre-defined cutoff parameter (for example $10^{-10}$).

These alignment probability estimates may be subject to data sparsity issues. Lexical weight estimates may provide a desirable alternative. Lexical weight estimates are similarly calculated using translation models, but work on word-level alignments. For every pair of bigrams $b_i$, $b_j$ from each corpus C, lexical weight estimates may be calculated as $$p_w(b_i | b_j, C)$$

Table 1 below shows an example of alignment probabilities of the phrase "chi 2008" from the n-gram graph 300. Moreover, Table 1 shows that the bigram "chi 2008" has alignment probabilities and lexical alignment probabilities to other bigrams in two parallel corpora (Query ↔ URL, and Query ↔ Title) but is merely aligned to itself in the other (Title ↔ URL) parallel corpus.

TABLE 1

Example of a first phrase ($b_i$) aligned to the second phrase ($b_j$) together with the alignment probabilities; the probability is not available if the two phrases do not align in the parallel corpus.

| | | Title ↔ URL | | Query ↔ URL | | Query ↔ Title | |
|---|---|---|---|---|---|---|---|
| $b_i$ | $b_j$ | $p(b_j \| b_i)$ | $p_w(b_i \| b_j)$ | $p(b_j \| b_i)$ | $p_w(b_i \| b_j)$ | $p(b_j \| b_i)$ | $p_w(b_i \| b_j)$ |
| chi 2008 | acm chi | — | — | — | — | 0.023 | — |
| chi 2008 | 2008 art | — | — | 0.013 | — | — | — |
| chi 2008 | chi 08 | — | — | 0.054 | 0.004 | 0.100 | 0.007 |
| chi 2008 | chi conference | — | — | 0.054 | 0.002 | 0.100 | 0.003 |
| chi 2008 | chi conferences | — | — | 0.013 | — | 0.023 | 0.001 |
| chi 2008 | sigchi 2008 | — | — | 0.013 | 0.001 | 0.023 | 0.001 |
| chi 2008 | chi 2008 | 0.650 | 0.354 | 0.825 | 0.059 | 0.825 | 0.125 |
| acm chi | chi 2008 | — | — | — | — | 0.100 | 0.002 |
| 2008 art | chi 2008 | — | — | 0.300 | — | — | — |
| chi 08 | chi 2008 | — | — | 0.650 | 0.013 | 0.650 | 0.051 |
| chi conference | chi 2008 | — | — | 0.163 | 0.007 | 0.100 | 0.011 |
| chi conferences | chi 2008 | — | — | 0.060 | 0.005 | 0.060 | 0.006 |
| sigchi 2008 | chi 2008 | — | — | 0.300 | 0.086 | 0.300 | 0.085 |

Once alignment probabilities are extracted from the parallel corpora, a graph may be made by assigning different edges of different types between aligned n-grams. The weight of each edge is equal to the alignment probability of its corresponding type. Overall, each node $b_i$ can have a maximum of six directed edges to another node $b_j$, each corresponding to one alignment estimate. The n-gram graph 300 shows a snapshot of a part of the graph surrounding the bigram "chi 2008" including the probabilities from Table 1. The size of each node in the n-gram graph 300 is proportional to its network centrality that shows the random walk-based significance of that node in the network. In this example, nodes like "chi 2008", "chi conference", and "chi conferences" are more central than others and are more likely to be visited by a random walk model. The last bigram "chi conference", for instance, may be useful to be added to the bigram "chi meetings" in a query that may relate to the ACM CHI conference website.

If different edge types are considered as different features, the marginal conditional probability between two bigrams, $b_i$ and $b_j$, may be calculated as a mixture model of these features.

$$p(b_i \mid b_j) = \sum_\theta p(\theta) p(b_i \mid b_j, \theta)$$

where $\theta$ represents a feature. i.e., (lexical) alignment probability from a parallel corpus. However, not all node pairs are connected in the graph built using alignment models. Therefore, it may not be feasible to calculate this conditional probability between all bigram pairs.

Figure 4:
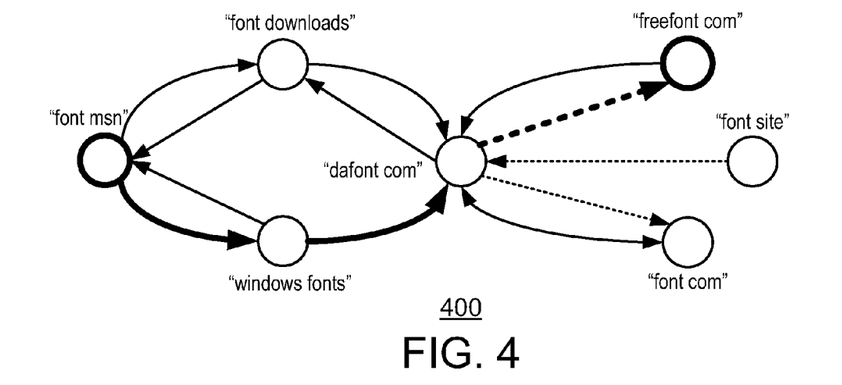
FIG. 4 is a block diagram of a multigraph created using clickstream data according to the subject innovation.

FIG. 4 is a block diagram of a multigraph 400 created using clickstream data according to the subject innovation. The dashed edges of the graph 400 are probabilities extracted by aligning Query↔URL data. Solid edges represent alignment probabilities from Query↔Title data. The exemplary graph 400 shows that different node pairs are reachable using multiple edge types while may not be accessible using any of the edge types alone. For instance, "freefont com" is reachable from "font msn" by traversing both edge types. The "freefont com" is not reachable using a single edge type. This leads to the idea of calculating the hitting time on a graph with different edge types of different weights.

2.3 Parametrized Hitting Time.

After building the graph with different edge types, the truncated hitting times may be used to calculate the proximity of different pairs. The truncated hitting time between a node pair in a network can be approximated accurately with high probability by sampling. To do so, one can run M independent random walks of length T from i. If node j is visited in m of these runs in $t^1, \ldots, t^m$ steps for the first time, then the estimated truncated hitting time is given by $$\hat{h}_{ij}^T = \frac{\sum_{k=1}^m t^k}{M} + \left(1 - \frac{m}{M}\right)T \qquad (2)$$

Each path in this random walk model includes a number of edges from different types, and therefore the path length $t^k$ can be re-written as a linear function of different types.

$$t^k = \Sigma \theta_l t_l^k.$$

where $w_l$ is the weight of the edge type l and $t_l$ is the number of edges of type l in $t^k$. Hence, Equation 2 may be rewritten as a function of different edge types in the graph.

$$\hat{h}_{ij}^T = \frac{\sum_{k=1}^m \sum_l \theta_l t_l^k}{M} + \left(1 - \frac{m}{M}\right)T \qquad (3)$$

For each bigram i, in the graph M independent random walks of length T are sampled. A calculation of $\hat{h}_{ij}^T$ to all reachable nodes, j, may be performed using Equation 3. This sampling method results in an accurate estimate, i.e., $P(|\hat{h}_{ij}^T - h_{ij}^T| \leq \epsilon T) \geq 1-\delta$, if $$M \geq \frac{1}{2\epsilon^2} \log \frac{2n}{d},$$

where n is the number of nodes in the graph, and $0 \leq \epsilon, \delta \leq 1$.

For purposes of example, suppose two random walks of length T are run on the sample graph of FIG. 4. Further suppose starting from the node "font msn" and reaching the node "freefont com" in less than T steps in merely one of these two walks. Under an assumption that the solid edges are of type 1 (with weight $\theta_1$), and the dashed edges are of type 2 (with weight $\theta_2$), and that the random walk traversed the bold path to reach "freefont com" then the random walk may include the path and the hitting time is calculated as $$\hat{h}_{\text{"fontmsn"} \to \text{"freefontcom"}}^T = \frac{1}{2}(2\theta_1 + \theta_2) + \left(1 - \frac{1}{2}\right)T$$
$$= w_1 + 0.5 w_2 + 0.5 T$$

2.4 Query Reformulation

The bigram graph structure and hitting time calculation enables finding effective alterations for bigrams. This functionality may be used to alternate queries. For a given query $q = (w_1 w_2 \ldots w_n)$ of length n, the hitting time from each of its bigrams $(w_i w_{i+1})$ and find possible candidates for that bigram may be calculated. Both of the reformulation types are examined below:

1. Substitution, in which the bigram in q is substituted with a new bigram, i.e., $(w_i w_{i+1}) \to (w_i' w_{i+1}')$
2. Expansion, in which the bigram in q is altered with the "OR" operator, i.e., $(w_i w_{i+1}) \to (w_i w_{i+1} \text{ OR } w_i' w_{i+1}')$ In addition, it may be desirable to limit the number of words to be changed in each bigram. In one exemplary embodiment, a limit of one word changed per bigram is used. That is, for all of the potential suggestions for $(w_i w_{i+1})$ from the random walk model, those bigrams $(w_i' w_{i+1}')$ in which at least one of $w_i = w_i'$ or $w_{i+1} = w_{i+1}'$ holds may be picked.

This process results in two lists of query-candidate pairs: one for substitution, and one for expansion. Each pair has a parametrized hitting time, which is the expected hitting time of the bigram that is altered in terms of different edge type, and an NDCG gain value.

Discounted Cumulative Gain (DCG) and its normalized version (NDCG), are measures of the effectiveness of a Web search engine algorithm, with two basic assumptions. First, highly relevant documents are more useful when appearing with higher ranks in a search engine result list. Second, highly relevant documents are more useful than marginally relevant documents, which are in turn more useful than irrelevant documents. Based on these assumptions, DCG for a ranked list of search results of size p can be calculated as:

$$DCG_p = \sum_{i=1}^p \frac{2^{S_i} - 1}{\log_2(1+i)} \qquad (4)$$

In Equation 4, $S_i$ is the manually judged relevance score of each search result URL, and obtains values from $\{0, 1, 2, 3, 4\}$, where 4 is more relevant, and 0 is less relevant. In order to normalize the DCG value, this value can be divided by an Ideal Discounted Cumulative Gain (IDCG). To calculate IDCG, the DCG of an ideal ordering of relevant URLs may be calculated. One such ordering could be obtained by sorting the relevance judgments, which are provided by manual annotators, decreasingly.

$$NDCG_p = \frac{DCG_p}{IDCG_p} \quad (5)$$

In an exemplary evaluation setup, for a given query q, (or its reformulation, c) q (or c) may be submitted to a search engine and obtain top p results (p=1,3,10). The results may be compared with human judgment scores provided for q and calculate NDCG. The goal of this work is to find candidates c that improve the NDCG of q.

Using Equation 5, $NDCG_p$ gain (ΔNDCG) of query-candidate pairs at p={1,3,10}. may be calculated. Table 2 shows different examples of query-candidate pairs and their corresponding estimated hitting times with positive and negative ΔNDCGs.

TABLE 2

Examples of query-candidate pairs together with their hitting times and NDCG gains (ΔNDCG) used as training data.

| Query | Candidate | Hitting Time | ΔNDCG @1 | @3 | @10 |
|---|---|---|---|---|---|
| classic auto | classic car | 7.14 + 0.23w₁ + 0.10w₂ + 0.45w₃ + 0.14w₄ + 0.37w₅ + 0.20w₆ | +1.00 | 0.82 | 0.40 |
| asia map | asia continent | 9.68 + 0.03w₁ + 0.01w₂ + 0.03w₃ + 0.01w₄ + 0.03w₅ + 0.02w₆ | +0.43 | +0.05 | −0.23 |
| 24 hour gym | 24 hour fitness | 9.63 + 0.04w₁ + 0.01w₂ + 0.07w₃ + 0.02w₄ + 0.01w₅ + 0.01w₆ | +0.43 | −0.03 | −0.12 |
| best public schools in ny | best public schools in nyc | 8.58 + 0.03w₁ + 0.01w₂ + 0.08w₃ + 0.04w₄ + 0.15w₅ + 0.01w₆ | 0.00 | +0.29 | +0.20 |
| 560 am radio | 560 am fm | 5.55 + 0.02w₁ + 0.01w₂ + 0.03w₃ + 0.02w₄ + 0.50w₅ + 0.16w₆ | 0.00 | +0.10 | +0.10 |
| designer wedding dresses | designer wedding dresses | 2.56 + 0.30w₁ + 0.12w₂ + 0.28w₃ + 0.14w₄ + 0.32w₅ + 0.21w₆ | 0.00 | 0.00 | 0.00 |
| altitudes in colorado | altitudes in denver | 9.46 + 0.02w₁ + 0.01w₂ + 0.08w₃ + 0.06w₄ + 0.80w₅ + 0.04w₆ | −0.28 | −0.53 | −0.39 |
| blackberry pie | blackberry 8830 | 9.98 + 0.01w₁ + 0.01w₃ + 0.01w₅ | −0.43 | −0.86 | −0.87 |
| area code 916 | area code sacramento | 3.60 + 0.65w₁ + 0.15w₂ + 1.92w₃ + 0.13w₄ + 0.32w₅ + 0.09w₆ | −0.48 | −0.46 | −0.42 |
| bank of america | bank of amrican | 9.99 + 0.01w₃ + 0.01w₅ | −1.00 | −0.31 | −0.20 |
| deptford police department | deptford police headquaters | 9.99 + 0.01w₁ + 0.01w₅ + 0.01w₆ | −1.00 | −0.68 | −0.47 |

A goal of the subject innovation is to find the most relevant parameters $w_i$ in the hitting time to predict the value of ΔNDCG. This task may be formulated as learning a linear model, which includes a mapping from inputs x∈X to outputs y∈Y. The training data includes a set of samples $(x_i, y_i)$ for i=1...N, where $y_i$ is a ΔNDCG value, and $x_i$ is a parametrized hitting time. An $L_1$-regularized log-linear model may be built on parametrized hitting times to predict ΔNDCG values of query-candidate pairs. Known methods may then be used to estimate the parameters of the hitting time values.

Suppose a procedure GEN generates a set of candidates GEN(x) for an input x. Also, assume that $\Phi: X \times Y \rightarrow R^D$ is a function that maps each (x, y) to a vector of feature values. Here, the feature vector is the vector of coefficients corresponding to path lengths of different types in parametrized hitting times, and the parameter vector $\theta \in R^D$ (D=6 in one example) assigns a real-valued weight to each feature. This estimator chooses θ to minimize the sum of the empirical loss on the training set and a regularization term R.

$$\hat{\theta} = \underset{\theta}{\operatorname{argmin}}\{L(\theta) + R(\theta)\} \quad (6)$$

L(θ) may be defined as the negative conditional log-likelihood of the training data, $$L(\theta) = -\sum_{i=1}^{n} \log P(y_i | x_i), \text{ where} \quad (7)$$

$$P(y|x) = \frac{\exp(\Phi(x, y) \cdot \theta)}{\sum_{y' \in GEN(x)} \exp(\Phi(x, y') \cdot \theta)} \quad (8)$$

and the regularizer term R(θ) is the weighted $L_1$ norm of the parameters $$R(\theta) = \alpha \sum_{j} |\theta_j| \quad (9)$$

Here, α is a parameter that controls the amount of regularization, optimized on held-out data.

It may be challenging to optimize an $L_1$-regularized objective because its gradient is discontinuous whenever some parameters equal zero. It may be possible to use an orthant-wise limited-memory quasi-Newton algorithm (OWL-QN), which is a modification of L-BFGS to effectively address the discontinuity of the gradient.

OWL-QN is based on the fact that when restricted to a single orthant, the $L_1$ regularizer is differentiable, and is in fact a linear function of θ. Thus, so long as each coordinate of any two consecutive search points does not pass through zero, R(θ) does not contribute at all to the curvature of the function on the segment joining them. Therefore, L-BFGS may be used to approximate the Hessian of L(θ) alone, and use it to build an approximation to the full regularized objective that is valid on a given orthant. This algorithm, is effective in practice, and typically reaches convergence in even fewer iterations than standard L-BFGS takes on the analogous $L_2$-regularized objective.

3 Operational Considerations 3.1 Win/Loss Ratio

The intuition behind a random-walk based model is that different sources of information, while used together, can enable the discovery of relations between phrases that are not related to each other in any of those information sources. In an exemplary embodiment, this intuition may be implemented as multiple data types and random walk paths that traverse multiple edge types. This model, which uses alignment as edge probabilities and random walks through multiple edge types, may be referred to as Align+MultiRWalk.

A method according to the subject innovation may be compared to other baselines. The first baseline, which is referred to herein as Align+RWalk, uses the same alignment model to extract bigram alignment probabilities and builds six different graphs each corresponding to one conditional probability model. For each bigram alteration, the expected hitting time is calculated in separate graphs and the values are used as learning features. Unlike Align+MultiRWalk, the baseline Align+RWalk does not allow random walks to traverse edges of different types in one sample. Therefore, the Align+RWalk is unable to discover new, potentially reachable, bigrams that are not reachable using a single edge type.

A second baseline, referred to herein as Align, uses alignment probabilities between different bigrams as features. Here, the potential reformulations are limited to include bigram pairs that have been aligned in the parallel corpora. This baseline can be considered a simple version of Align+RWalk where the random walks are limited to paths of length T=1.

To compare the three methods, a k-fold cross validation (for example, a 10-fold cross validation) may be performed. In addition, a linear model on 9 tenth of the original queries and all their candidates to is learned to predict the value of $\Delta NDCG_p$ for the rest. For each original query q in the test set, the candidate with the most effective $\Delta NDCG_p$ estimate is found and reported as a reformulation.

To evaluate the reformulation, the Win/Loss Ratio of the suggested candidate c may be calculated. If the actual NDCG gain of altering q to c is positive, it is a win, and if it is negative, then it is a loss. If changing q to c does not change the NDCG then it is neutral.

$$\text{Win/Loss Ratio} = \frac{\#Win}{\#Loss}$$

These values may be calculated for two separate runs on the system: Substitution and Expansion. Win/Loss Ratios may be calculated based on training the model on $NDCG_p$ at p=1,3,10 when the bigram in the original query is substituted with the candidate bigram. In addition, Win/Loss Ratios may be calculated based on training the model on $NDCG_p$ at p=1, 3,10 when the bigram in the original query is expanded by adding the candidate bigram and an "OR" operator.

According to the subject innovation, a model based on random walk on multiple edge types has higher performance than the other baselines that have been evaluated. To assess the effect of an exemplary embodiment of the subject innovation in increasing the Win/Loss ratio, the number of neutral reformulations that each model produces may be plotted. Neutral reformulations are candidates that are either identical to the original query, or are different but result in an identical NDCG value, and therefore the gain is equal to 0. The number of neutral reformulations may be calculated based training the model on $NDCG_p$ at p=1,3,10 for both cases: substitution and expansion. This data indicates that the subject innovation may produce fewer false positives and therefore increases the win/loss ratio.

3.2 Retrieval Quality

Although NDCG measures the quality of retrieval, the NDCG value calculated for a ranked list of retrieved documents is dependent both on the retrieval system, and the ranker. In some retrieval systems these are two separate sub-components. That means, first a set of relevant documents are identified and retrieved, and then the ranker would sort them based on a relevance score. To measure the quality of the retrieval system alone (and not the ranker), $$NDCG_p^{max}$$

may be defined. To calculate this value for a query q, q is submitted to the search engine and retrieve top p documents. Then, before calculating DCG, these p documents may be re-ranked based on human judgment scores decreasingly. The DCG may then be calculated on the sorted list. This will provide a result that the measured entity is independent of the ranker quality.

$$NDCG_p^{max}$$

can be defined as Equation 10.

$$NDCG_p^{max} = \frac{DCG_p^{max}}{IDCG_p} \qquad (10)$$

According to the subject innovation, models may be trained on six different values of $$NDCG_p^{max}$$

(expansion/substitution; p=1,3,10). Associated Win/Loss ratios may be calculated. The six values may be plotted versus corresponding values of the models trained on $NDCG_p$. Plotting the values in this manner shows a high correlation between the ratios in different models, and suggests that a methodology according to the subject innovation also improves the retrieval model when assuming an error-free ranker.

3.3 NDCG

The NDCG scores of the candidates generated according to the subject innovation may be compared to other methods that use hitting time as a measure of query reformulation. Such methods build a multigraph (for example, a bipartite graph) in which nodes on one part represent queries and nodes on the other part represent URLs. There is an edge between a query and a URL if the URL has been clicked on in the search results. For a given input query q, the query node with the least expected hitting time to q may be found and returned as a reformulation for q.

In evaluating a method according to the subject innovation, a large multigraph may be built using the (Query↔URL) clickthrough data. For each test query, q, the expected hitting time may be calculated on the graph and the top candidate may be found with the smallest average hitting time. $NDCG_p$ (p=1,3,10) may then be calculated for each reformulation q→c.

For each test query, q random walk model may be used on the phrase graph to find a set of candidates. The expected hitting time may be calculated, and $\Delta NDCG_p$ may be estimated for each q-candidate pair. The top candidate with the highest estimated $NDCG_p$ gain may be kept as a reformulation. A method according to the subject innovation may produce improved candidates, and therefore more query-candidate pairs with high $NDCG_p$ values.

Figure 5:
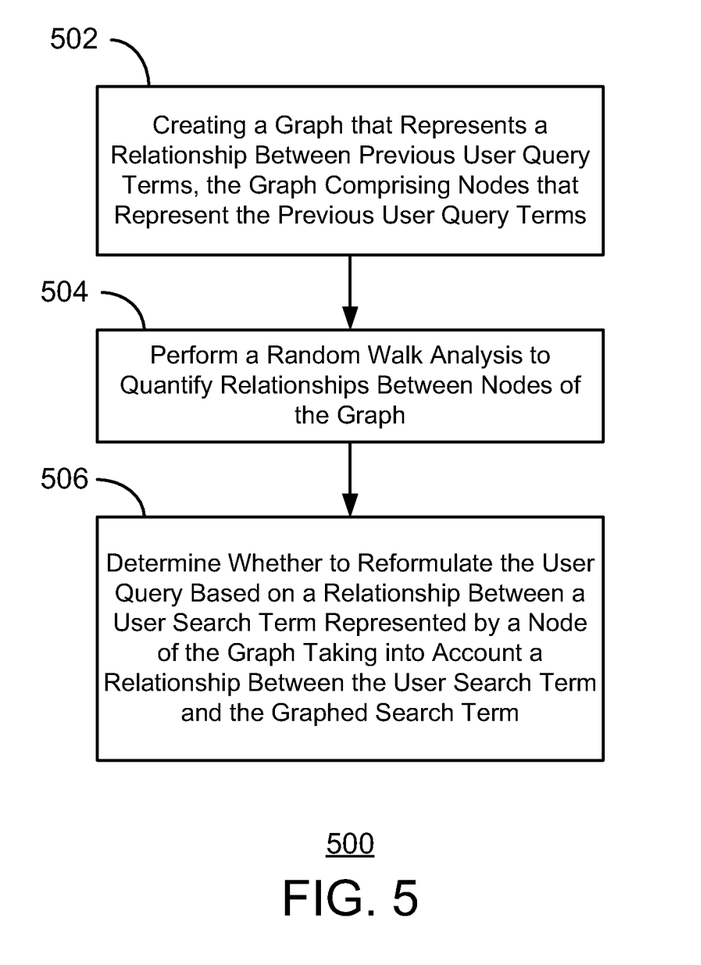
FIG. 5 is a process flow diagram of a method for user query reformulation in accordance with the subject innovation.

FIG. 5 is a process flow diagram of a method 500 for user query reformulation in accordance with the subject innovation. At block 502, a graph that represents a relationship between previous user query terms is created. Creation of the graph may employ clickstream data, as described herein. The graph comprises nodes that represent search terms of the previous user queries.

As shown at block 504, a random walk analysis is performed to quantify relationships between nodes of the graph. This quantification may comprise a probability that a search term represented by one node would be useful in reformulating a query involving another search term. At block 506, a determination is made regarding whether to reformulate the user query based on a relationship between a user search term in the user query and a graphed search term represented by a node of the graph. The reformulation decision may take into account a relationship between the user search term and the graphed search term.

Figure 6:
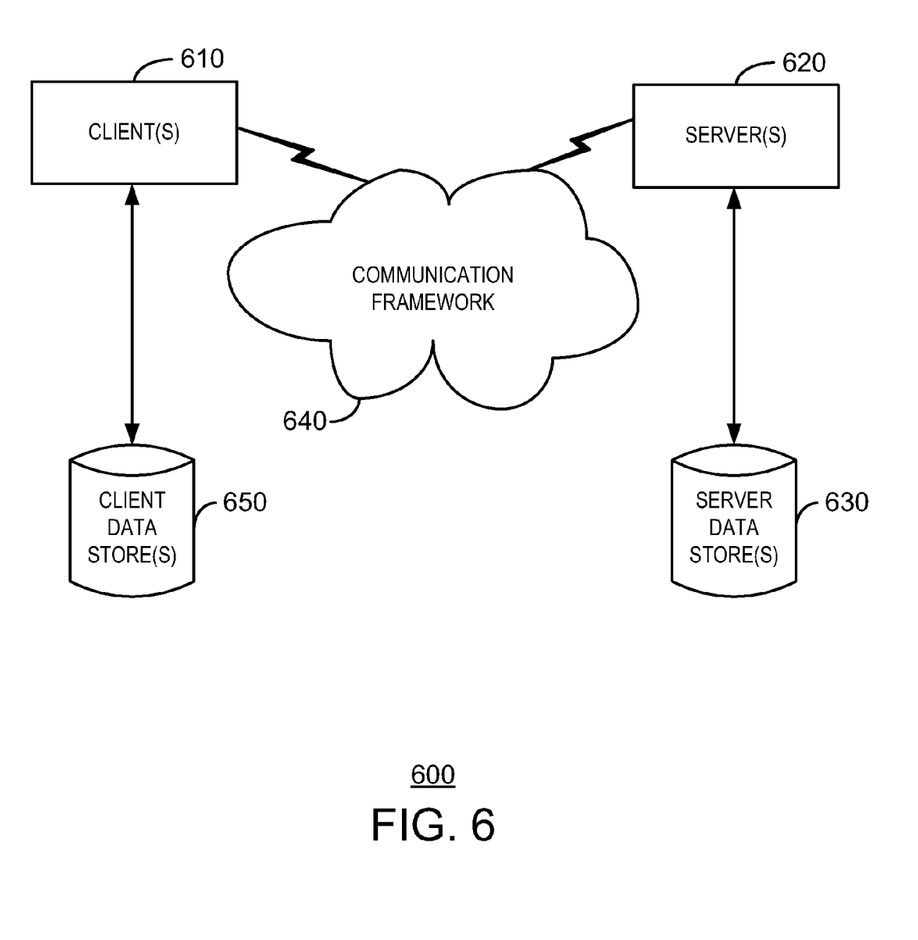
FIG. 6 is a block diagram of an exemplary networking environment wherein aspects of the claimed subject matter can be employed.
Figure 7:
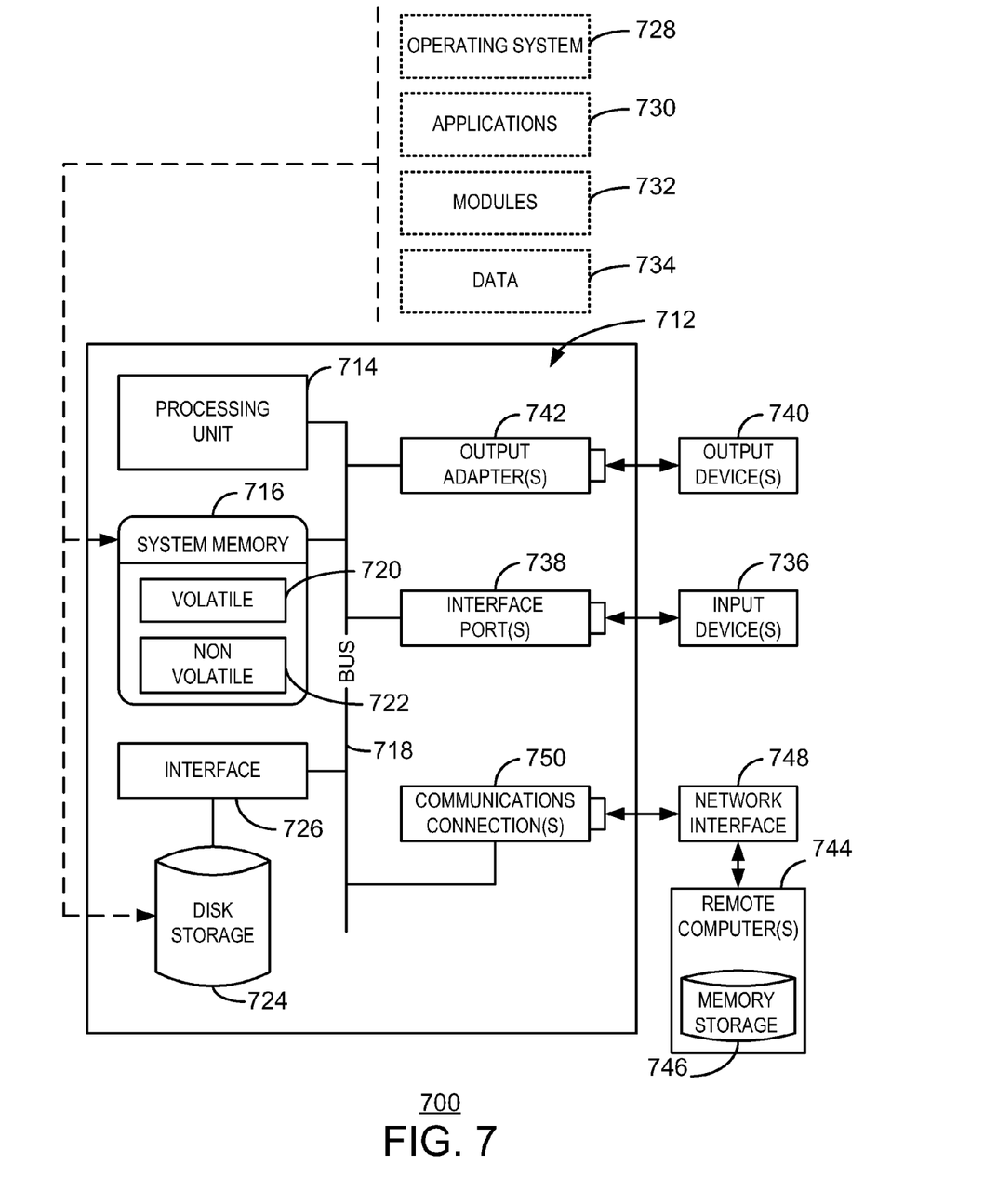
FIG. 7 is a block diagram of an exemplary operating environment that can be employed in accordance with the subject innovation.

In order to provide additional context for implementing various aspects of the claimed subject matter, FIGS. 6-7 and the following discussion are intended to provide a brief, general description of a suitable computing environment in which the various aspects of the subject innovation may be implemented. For example, a content filter, as described in the previous figure, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the subject innovation may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 6 is a schematic block diagram of a sample-computing system 600 with which the claimed subject matter can interact. The system 600 includes one or more client(s) 610. The client(s) 610 can be hardware and/or software (e.g., threads, processes, computing devices). The system 600 also includes one or more server(s) 620. The server(s) 620 can be hardware and/or software (e.g., threads, processes, computing devices). The servers 620 can house threads to perform search operations by employing the subject innovation, for example.

One possible communication between a client 610 and a server 620 can be in the form of a data packet adapted to be transmitted between two or more computer processes. The system 600 includes a communication framework 640 that can be employed to facilitate communications between the client(s) 610 and the server(s) 620. The client(s) 610 are operably connected to one or more client data store(s) 650 that can be employed to store information local to the client(s) 610. The client data store(s) 650 may be stored in the client(s) 610, or, may be located remotely, such as in a cloud server. Similarly, the server(s) 620 are operably connected to one or more server data store(s) 630 that can be employed to store information local to the servers 620.

As an example, the client(s) 610 may be computers providing access to social search engine sites over a communication framework 640, such as the Internet. The server(s) 620 may be search engine sites accessed by the client 610.

With reference to FIG. 7, an exemplary environment 700 for implementing various aspects of the claimed subject matter includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures known to those of ordinary skill in the art.

The system memory 716 is non-transitory computer-readable media that includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read-only memory (ROM), programmable ROM (PROM), electrically programmable ROM (EPROM), electrically erasable programmable ROM (EEPROM), or flash memory.

Volatile memory 720 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 712 also includes other non-transitory computer-readable media, such as removable/non-removable, volatile/non-volatile computer storage media. FIG. 7 shows, for example a disk storage 724. Disk storage 724 includes, but is not limited to, devices like a magnetic disk drive, floppy disk drive, tape drive, Jaz drive, Zip drive, LS-100 drive, flash memory card, or memory stick.

In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in the suitable operating environment 700. Such software includes an operating system 728. Operating system 728, which can be stored on disk storage 724, acts to control and allocate resources of the computer system 712.

System applications 730 take advantage of the management of resources by operating system 728 through program modules 732 and program data 734 stored either in system memory 716 or on disk storage 724. It is to be appreciated that the claimed subject matter can be implemented with various operating systems or combinations of operating systems.

A user enters commands or information into the computer 712 through input device(s) 736. Input devices 736 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 736 connect to the processing unit 714 through the system bus 718 via interface port(s) 738. Interface port(s) 738 include, for example, a serial port, a parallel port, a game port, and a universal serial bus (USB).

Output device(s) 740 use some of the same type of ports as input device(s) 736. Thus, for example, a USB port may be used to provide input to the computer 712, and to output information from computer 712 to an output device 740.

Output adapter 742 is provided to illustrate that there are some output devices 740 like monitors, speakers, and printers, among other output devices 740, which are accessible via adapters. The output adapters 742 include, by way of illustration and not limitation, video and sound cards that provide a means of connection between the output device 740 and the system bus 718. It can be noted that other devices and/or systems of devices provide both input and output capabilities such as remote computer(s) 744.

The computer 712 can be a server hosting a search engine site in a networked environment using logical connections to one or more remote computers, such as remote computer(s) 744. The remote computer(s) 744 may be client systems configured with web browsers, PC applications, mobile phone applications, and the like, to allow users to access the social networking site, as discussed herein. The remote computer(s) 744 can be a personal computer, a server, a router, a network PC, a workstation, a microprocessor based appliance, a mobile phone, a peer device or other common network node and the like, and typically includes many or all of the elements described relative to the computer 712. For purposes of brevity, the remote computer(s) 744 is illustrated with a memory storage device 746. Remote computer(s) 744 is logically connected to the computer 712 through a network interface 748 and then physically connected via a communication connection 750.

Network interface 748 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to the computer 712. The hardware/software for connection to the network interface 748 may include, for example, internal and external technologies such as, mobile phone switches, modems including regular telephone grade modems, cable modems and DSL modems, ISDN adapters, and Ethernet cards.

An exemplary embodiment of the computer 712 may comprise a server hosting a search engine site. An exemplary processing unit 714 for the server may be a computing cluster comprising Intel® Xeon CPUs. The search engine may be configured to perform reformulation of search queries according to the subject innovation.

The subject innovation relates to a method of reformulating search queries in which expansion candidates are acquired by random walk on a graph that derived by aligning terms in document streams. The models described herein have relied on data derived from document streams and user behavior. Moreover, a model according to the subject innovation is extensible and affords a natural and relatively principled means of integrating heterogeneous data.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc. which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to merely one of several implementations, such a feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer-implemented method for user query reformulation, the method comprising:
    creating, using a processor, a graph that represents a relationship between previous user query terms, the graph comprising nodes that represent the previous user query terms, each of the nodes comprising an n-gram, and edges connecting the nodes;
    wherein creating the graph comprises performing a random walk analysis to quantify relationships between nodes of the graph, wherein performing the random walk analysis comprises:
        generating parallel corpora of paired phrases based on a plurality of different fields comprising a plurality of content fields and one or more a popularity fields such that a plurality of edge types occur between at least two nodes;
        extracting a plurality of aligned n-grams based on alignment probabilities between different n-grams;
        generating the edges between the aligned n-grams based on the alignment probability of each corresponding edge type; and
    determining whether to reformulate a user query based on a relationship between a user search term in the user query and a graphed search term represented by a node of the graph taking into account a relationship between the user search term and the graphed search term.

2. The computer-implemented method recited in claim 1, comprising taking into account the plurality of edge types between nodes of the graph when performing the random walk analysis to identify the graphed search term.

3. The computer-implemented method recited in claim 1, comprising terminating the random walk analysis based on a hitting time analysis.

4. The computer-implemented method recited in claim 3, wherein the hitting time analysis indicates a degree of relevance between the graphed search term and the user search term, and wherein a hitting time is truncated to an estimate truncated hitting time based on sampling of a plurality of independent random walks having a plurality of edge types.

5. The computer-implemented method recited in claim 1, comprising optimizing a model that is used to determine whether to reformulate the user query.

6. The computer-implemented method recited in claim 1, wherein the graph comprises a multigraph, wherein a multigraph comprises the at least two nodes of the graph having multiple edges types between the two nodes representing a plurality of different kinds of relationships between the two nodes.

7. The computer-implemented method recited in claim 1, comprising reformulating the user query using substitution.

8. The computer-implemented method recited in claim 1, comprising reformulating the user query using expansion.

9. The computer-implemented method recited in claim 1, comprising executing the user query without reformulation when the graphed search term is the same as the user search term wherein an n-gram translates as itself.

10. A system for improving the quality of search results, comprising:
    a processing unit; and
    a system memory, wherein the system memory comprises code configured to direct the processing unit to:
        determine whether to reformulate a user query to a search engine based on a relationship between a user search term in the user query and a graphed search term represented in a graph having nodes that represent search terms of previous user queries and edges representing relationships between previous search terms, and each of the nodes comprising a n-gram, the decision to reformulate the user query taking into account the relationship between the user search term and the graphed search term, the relationship being based in part on a result of a random walk analysis on multiple edge types between two of the nodes to quantify relationships between nodes of the graph;
    wherein performing the random walk analysis comprises:
        generating parallel corpora of paired phrases based on a plurality of different fields comprising a plurality of content fields and one or more a popularity fields such that a plurality of edge types occur between at least two nodes;
        extracting a plurality of aligned n-grams based on alignment probabilities between different n-grams;
        generating the edges between the aligned n-grams based on the alignment probability of each corresponding edge type.

11. The system recited in claim 10, wherein the plurality of edge types between nodes of the graph is taken into account when performing the random walk analysis to identify the graphed search term.

12. The system recited in claim 10, wherein the random walk analysis is terminated based on a hitting time analysis.

13. The system recited in claim 12, wherein the hitting time analysis indicates a degree of relevance between the graphed search term and the user search term, and wherein a hitting time is truncated to an estimate truncated hitting time based on sampling of a plurality of independent random walks having a plurality of edge types.

14. The system recited in claim 10, wherein the user query is reformulated using substitution.

15. The system recited in claim 10, wherein the user query is reformulated using expansion.

16. One or more computer-readable storage media, comprising code configured to direct a processing unit to:
  determine whether to reformulate a user query to a search engine based on a relationship between a user search term in the user query and a graphed search term represented by a node of a graph that describes a relationship between previous user query terms, the node comprising a n-gram, and edges connecting the nodes, the determination to reformulate the user query taking into account a relationship between the user search term and the graphed search term, the relationship being determined in part based on a result of a random walk analysis to quantify relationships between nodes of the graph, and wherein performing the random walk analysis comprises:
    generating parallel corpora of paired phrases based on a plurality of different fields comprising a plurality of content fields and one or more a popularity fields such that a plurality of edge types occur between at least two nodes;
    extracting a plurality of aligned n-grams based on alignment probabilities between different n-grams;
    generating the edges between the aligned n-grams based on the alignment probability of each corresponding edge type.

17. The one or more computer-readable storage media recited in claim 16, wherein performing the random walk analysis comprises determining a normalized discounted cumulative gain for each edge.

18. The computer-implemented method recited in claim 1, wherein each n-gram comprises at least a bi-gram configured to enforce context in the random walk analysis, and wherein performing the random walk analysis comprises calculating lexical weight estimates for each of the plurality of aligned n-grams at a unigram level.

19. The computer-implemented method recited in claim 1, wherein the size of each node in the graph is proportional to a likelihood that the node will be visited by the random walk analysis.

20. The computer-implemented method recited in claim 1, wherein the paired phrases represent the plurality of edge types comprising:
  an edge type associated with a pairing occurring between a previously searched query and a title of a previously searched document;
  an edge type associated with a pairing occurring a previously searched query and an uniform resource locator (URL) of a previously searched document;
  an edge type associated with a pairing occurring between a URL of a previously searched document and title of a previously searched document; and
  wherein each pair represents a separate parallel corpus.

* * * * *